(12) United States Patent
Lefort et al.

(10) Patent No.: US 12,142,394 B2
(45) Date of Patent: Nov. 12, 2024

(54) ELECTRICAL INSULATION MATERIAL AND MANUFACTURING PROCESS

(71) Applicants: SUPERGRID INSTITUTE, Villeurbanne (FR); CENTRE NATIONAL DE LA RECHERCHE SCIENTIFIQUE (CNRS), Paris (FR); UNIVERSITE CLAUDE BERNARD LYON 1, Villeurbanne (FR); INSTITUT NATIONAL DES SCIENCES APPLIQUEES DE LYON, Villeurbanne (FR); UNIVERSITE JEAN MONNET SAINT ETIENNE, Saint Etienne (FR)

(72) Inventors: Thibaut Lefort, Villeurbanne (FR); Damien Bachellerie, Lyons (FR); Sébastien Pruvost, Trevoux (FR); Jannick Duchet, Saint Euphemie (FR); Sébastien Livi, Villeurbanne (FR)

(73) Assignees: SUPERGRID INSTITUTE, Villeurbanne (FR); CENTRE NATIONAL DE LA RECHERCHE SCIENTIFIQUE (CNRS), Paris (FR); UNIVERSITE CLAUDE BERNARD LYON 1, Villeurbanne (FR); INSTITUT NATIONAL DES SCIENCES APPLIQUEES DE LYON, Villeurbanne (FR); UNIVERSITE JEAN MONNET SAINT ETIENNE SAINT, Saint Etienne (FR)

( * ) Notice: Subject to any disclaimer, the term of this patent is extended or adjusted under 35 U.S.C. 154(b) by 617 days.

(21) Appl. No.: 17/296,598

(22) PCT Filed: Dec. 27, 2019

(86) PCT No.: PCT/FR2019/053305
§ 371 (c)(1),
(2) Date: May 25, 2021

(87) PCT Pub. No.: WO2020/141280
PCT Pub. Date: Jul. 9, 2020

(65) Prior Publication Data
US 2022/0028574 A1    Jan. 27, 2022

(30) Foreign Application Priority Data
Dec. 31, 2018 (FR) ........................................ 1874421

(51) Int. Cl.
| C08K 5/19 | (2006.01) |
| C08K 5/5313 | (2006.01) |
| H01B 3/40 | (2006.01) |
| H01B 19/02 | (2006.01) |
| H02B 13/045 | (2006.01) |

(52) U.S. Cl.
CPC ................. *H01B 3/40* (2013.01); *C08K 5/19* (2013.01); *C08K 5/5313* (2013.01); *H01B 19/02* (2013.01); *H02B 13/045* (2013.01)

(58) Field of Classification Search
CPC .................................. C08L 63/00; H01B 3/40
USPC ......................................................... 524/403
See application file for complete search history.

(56) References Cited

U.S. PATENT DOCUMENTS

| 2005/0215749 | A1* | 9/2005 | Miyake ................... C08G 59/24 528/87 |
| 2009/0030158 | A1 | 1/2009 | Amano et al. |
| 2009/0186975 | A1 | 7/2009 | Schaal et al. |
| 2011/0092640 | A1* | 4/2011 | Tzou ........................ C08L 35/06 524/600 |
| 2014/0353004 | A1* | 12/2014 | Jung ......................... C08J 5/244 174/250 |
| 2019/0276662 | A1* | 9/2019 | Friesen .............. C08G 59/5033 |
| 2019/0330412 | A1 | 10/2019 | Li et al. |
| 2021/0234334 | A1* | 7/2021 | Menezo .................... H01S 5/11 |

FOREIGN PATENT DOCUMENTS

| CN | 102964778 A | 3/2013 |
| CN | 106753133 A | 5/2017 |
| WO | 96/01481 | 1/1996 |
| WO | 98/32138 | 7/1998 |
| WO | 2012/158292 A1 | 11/2012 |
| WO | WO 2016175271 | * 11/2016 |
| WO | 2017/001182 A1 | 1/2017 |

OTHER PUBLICATIONS

Yamamoto et al., electronic translation of WO 2016175271, Nov. 2016.*
Chinese Office Action, dated Oct. 10, 2022, corresponding to Chinese Application No. 2019800855674.
International Search Report, dated May 18, 2020, corresponding to PCT/FR2019/053305.
French Search Report, dated Nov. 25, 2019, corresponding to French Application No. 1874421.

* cited by examiner

*Primary Examiner* — Terressa Boykin
(74) *Attorney, Agent, or Firm* — LADAS & PARRY LLP; Malcolm J. MacDonald, Esq.

(57) ABSTRACT

The invention relates to an electrically insulating composite material (1) comprising a polyepoxide matrix (2) of cycloaliphatic type or of diglycidyl ether type in a content of less than 40% by mass, from 20 to 75% by mass of one or several micrometric and/or mesometric filler(s) (3), and from 0.1 to 20% by mass of at least one ionic liquid (4), the masses being expressed relative to the total mass of the electrically insulating composite material (1). The invention also relates to a method for manufacturing such an electrically insulating composite material (1), as well as its use for an electrically insulating support (9) in a metal-enclosed substation (5).

24 Claims, 2 Drawing Sheets

[Fig. 1]
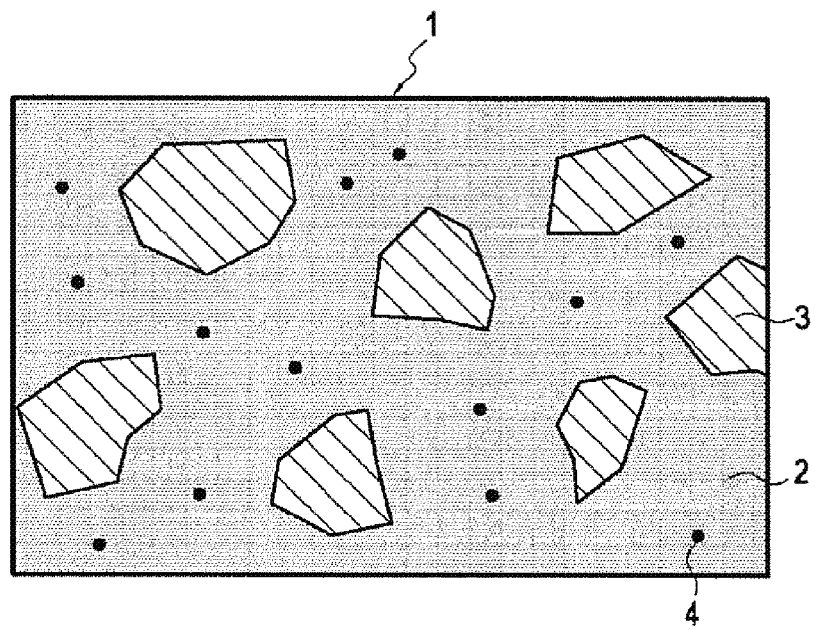
[Fig. 2]
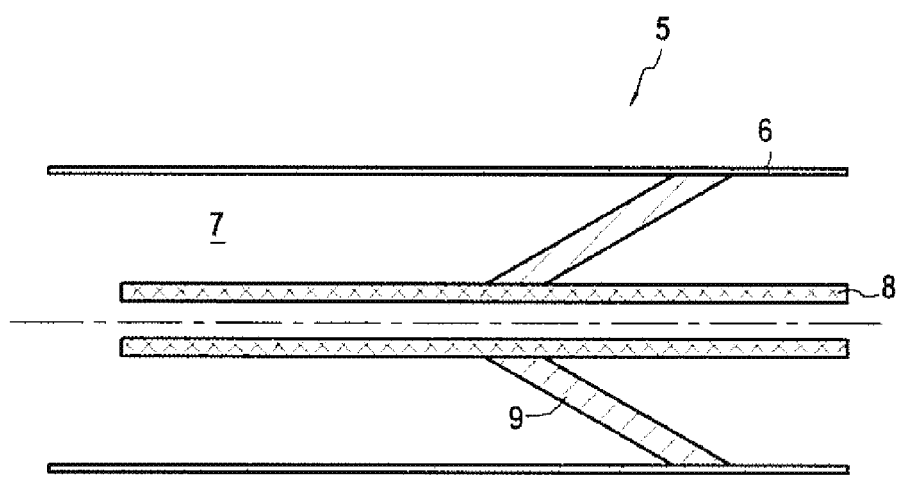

[Fig. 3]
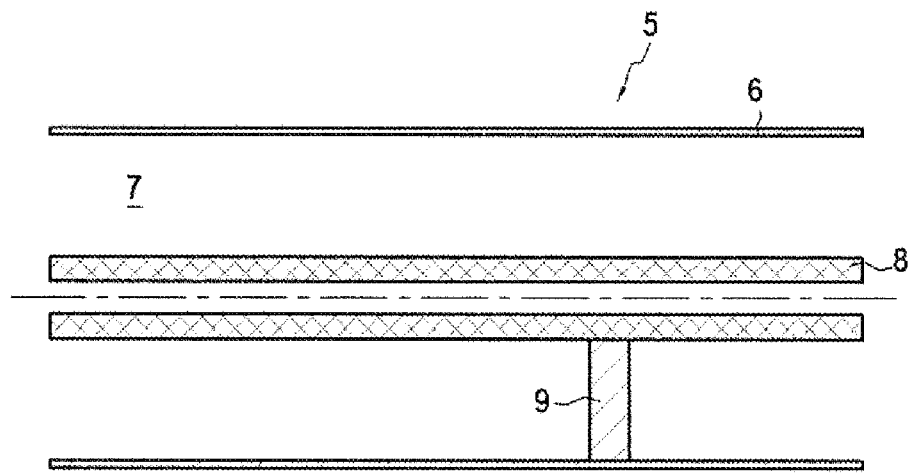
[Fig. 4]
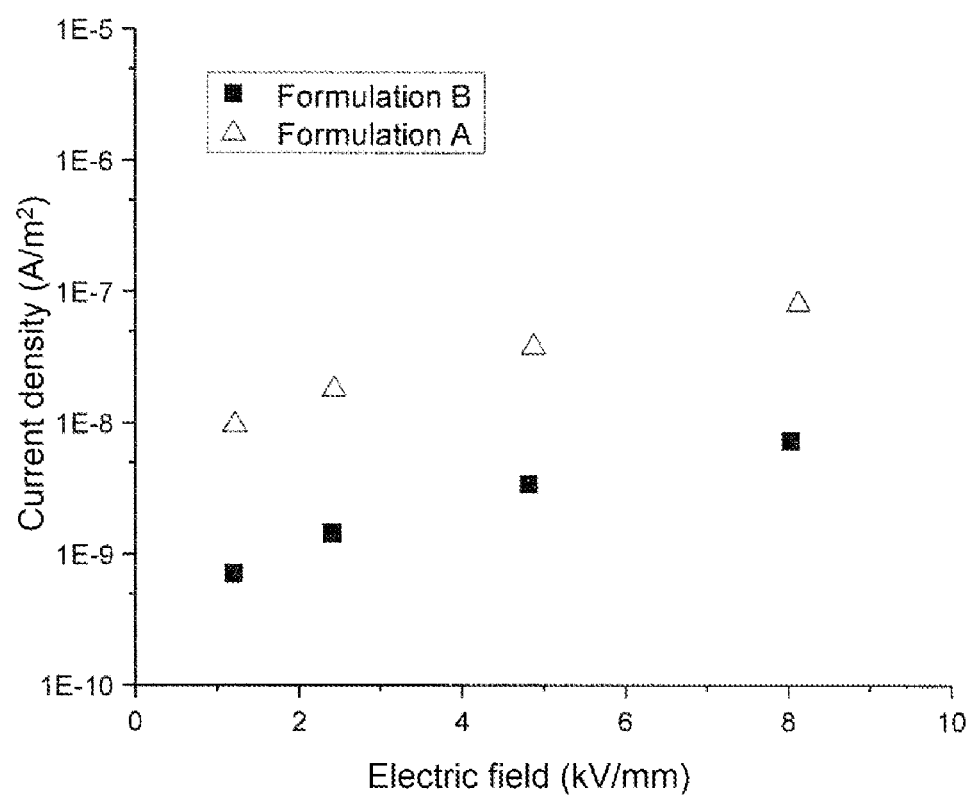

ELECTRICAL INSULATION MATERIAL AND MANUFACTURING PROCESS

The present invention relates to an electrically insulating composite material, which can in particular be used to make insulating supports for electrical conductors in high voltage electrical equipment, such as metal-enclosed substation, commonly referred to by the acronym GIS (Gas Insulated Substation), and subjected to a high voltage direct current.

The integration of the renewable energies into the electric network involves the use of a High Voltage Direct Current (HVDC) technology, in order to limit the losses over long distances connecting the production sites (e.g. the offshore wind turbines) to the places of consumption. However, the entire current network operates under High Voltage Alternating Current (HVAC). These two technologies do not induce the same phenomena. The network and its components must therefore be redesigned and developed for the HVDC.

Conventionally, a metal-enclosed substation consists of a high voltage electrical conductor held in the center of a metal shell using electrically insulating supports, such as spacers. The outer shell is grounded and the electrical insulation of each phase relative to the mass is ensured by an insulating medium with high dielectric strength, typically $SF_6$. These substations are very compact and can be installed inside or outside buildings.

In order to be used as an electrical insulator, the material of the insulating supports must have a low porosity, a high dielectric strength, a low dielectric permittivity and a low coefficient of thermal expansion. In addition, during their use, the electrically insulating supports are subjected to a permanent electrical stress that can cause the occurrence of locally hot spots. It is therefore important that the material of the insulating supports also has a high thermal conductivity, and this throughout the service life of the supports. In addition, the phenomena of accumulation of electric charges form part of the new issues imposed by the HVDC compared to the HVAC. Indeed, the application of a direct voltage causes an accumulation of electric charges in surface and volume of the insulating support, which can eventually cause the occurrence of electric arcs and therefore a dangerous degradation of the devices. This phenomenon is aggravated when a temperature gradient appears between the conductor and the metal shell.

Generally, the electrically insulating supports are made of a composite material, i.e. of an assembly of at least two immiscible components. Typically, the insulating supports are composed of an organic matrix in which one or several filler(s) are dispersed. The matrix is an electrically insulating material, for example formed by the crosslinking of a reactive system of comonomers, one of which may optionally be a hardener. The fillers can be of organic or inorganic, micrometric or nanometric type, and of different geometries, with variable form factors. Other additives can be included in this matrix, such as diluents or plasticizers for example. Such composite materials are for example described in patent applications WO 98/32138 and WO 2008/009560.

In order to overcome the accumulation of direct current electric charges, it is necessary to improve their evacuation. To do so, various areas of development have been envisaged.

A first possibility is to modify the geometry of the electrically insulating support in order to monitor some localized phenomena. The composition of the material constituting the electrically insulating support is then unchanged. However, this option mainly consists in greatly increasing the dimensions of the electrically insulating supports, which represents a very large footprint. In addition, the resistance of such parts over time is uncertain. In addition, this possibility is known to have a low impact on the charge accumulation. The geometry of the insulating supports mainly affects the breakdown resistance.

A second possibility is to carry out a surface treatment on the electrically insulating support. In this case, the composition of the material constituting the electrical insulator is unchanged and a surface treatment allows modifying its properties only on the surface. This option requires a new method step. Even if, according to recent studies, some surface treatments, such as fluorination for example, seem to produce results, the impacts of such methods on health and on the environment seem to be a real disadvantage.

A third possibility is to modify the nature of the material constituting the electrical insulator. Indeed, the modification and/or the deletion and/or the addition of some components allow modifying the properties of the electrical insulation material. This last option has the advantage of being able to produce supports of reasonable dimensions. In addition, the properties of the material are changed not only on the surface but also throughout the volume.

The latter option being more advantageous, research has therefore focused more generally on modifying the composition of the electrical insulation material. As such, several ways have been envisaged: modification of the matrix, modification of the fillers or addition of an additive.

As regards the matrix, the modifications may relate to its chemical nature and to its architecture. However, any modification of the matrix requires a heavy research work on the material as well as an adaptation of the method for manufacturing the electrically insulating composite material.

With regard to the fillers, the use of carbon-based conductive fillers, micrometric or nanometric inorganic fillers, or fillers allowing, under certain conditions, to obtain a non-linear conductivity based on the electric field (known as RFGM for Resistive Field Grading Materials) was envisaged. The carbon-based conductive fillers have a very strong impact on the conductivity, making the optimization of the conductivity very difficult, which makes them difficult to use from an industrial point of view. The nanometric fillers are complex to disperse in the matrix due to the viscosity increase and to the need to monitor the dispersion of the fillers to prevent the formation of aggregates. In addition, the health and safety constraints during their use are heavy due to the need to avoid their spreading in the air. The RFGM fillers are also difficult to disperse optimally and their implementation is difficult to reproduce.

There is therefore a need for an electrically insulating composite material which not only has a low porosity, a high dielectric strength, a low dielectric permittivity, a low coefficient of thermal expansion, a high thermal conductivity, a good mechanical resistance, a good resistance to electrical erosion and to internal propagation of electric arcs, but also an electrical conductivity greater than that of the usual high voltage insulating materials (in surface and in volume). Indeed, better evacuation of the electric charges over time allows preventing their accumulation. Advantageously, the conductivity of the electrically insulating composite material according to the invention can be adjusted according to the nature and to the proportions of the different components used to manufacture it. Advantageously, this electrically insulating composite material is easy to manufacture.

The invention proposes the addition of an organic, inorganic or hybrid additive to slightly increase the electrical conductivity of the electrically insulating composite material. For that, the additive must allow finding a balance between improved conductivity to avoid the phenomenon of accumulation of electric charges, and electrical insulation which is its primary function. Indeed, the addition of an additive that is too conductive or moderately conductive in large quantities will transform the electrically insulating composite material into a conductive material, and will therefore be unusable. The Applicant has discovered that the use of ionic liquids, into adequate quantities, allowed finding such a compromise, while preserving the properties required for an electrically insulating composite material used in HVDC.

The ionic liquids are compounds entirely composed of ions (a combination of cations and anions) like the molten salts, but are distinguished by a melting point below 100° C. The ionic liquids have particular physicochemical properties which explain their interest: thermal and chemical stability, high boiling temperature and negligible vapor pressure (hence very low volatility), high ionic conductivity (and therefore good electrical conductivity). There is a wide variety of ionic liquids. The cations are organic in nature and may be of the ammonium, phosphonium, thiazolium or sulfonium type, for example. The choice of anions is also wide: the anions can be organic (aluminates, alkylsulfates, alkylsulfonates or phosphinates for example) or inorganic (halides or hexafluorophosphate for example).

The use of ionic liquids has not been envisaged for the electrical insulation due to their electrically conductive properties, which defeats the primary purpose of an electrical insulator. In addition, the ionic liquids are known for their plasticizing properties, which risks damaging the mechanical properties of the insulators, in particular if plasticizing agents are present.

Compositions comprising an epoxy resin and ionic liquids, without fillers, have been described in patent applications US 2009/030158 and WO 2018/000125, but not their use for the electrical insulation. Furthermore, a composition comprising an epoxy resin, 1-9% by mass of palygorskite and 1-9% by mass of ionic liquid, relative to the mass of epoxy resin, has been described in the application CN 102 964 778, but not its use for its electrical insulating properties. The palygorskite is a silicate, and is therefore incompatible with the $SF_6$ which is conventionally used as so an insulator in the GIS and in particular with its by-products. In addition, the preparation method comprises the use of diluent and various other additives, as well as a heating to 50-70° C., which limits the possible electrical insulation properties of the final material.

In this context, the invention relates to an electrically insulating composite material formed from:
  i) a polyepoxide matrix of cycloaliphatic type or of diglycidyl ether type in a content of less than 40% by mass,
  ii) from 20 to 75% by mass of one or several micrometric and/or mesometric filler(s),
  iii) from 0.1 to 20% by mass of at least one ionic liquid, the masses being expressed relative to the total mass of the electrically insulating composite material.

Within the framework of the invention, a "polyepoxide matrix" refers to a crosslinked epoxy polymer.

By "micrometric filler" it is meant fillers whose largest dimension is comprised between 2 micrometers and 100 micrometers.

Within the framework of the invention, the dimensions are number average dimensions. These can be measured using measurement software coupled with a microscope, such as a scanning electron microscope, SEM.

By "mesometric filler" it is meant fillers whose largest dimension is comprised between 100 nanometers and 2 micrometers.

The electrically insulating composite material according to the invention has a good electrical resistance, a good mechanical resistance, a good resistance to electrical erosion and to internal propagation of electric arcs, and an electrical conductivity greater than that of the usual insulating materials for high voltage while preserving electrical insulation properties. Indeed, the choice of the different components, and particularly of the filler(s) and of the ionic liquid(s), and their respective quantities, allowed finding a compromise between these a priori so contradictory properties. Advantageously, the electrical conductivity of the electrically insulating material in accordance with the invention can be adjusted thanks to the nature of the fillers and of the ionic liquids used, and their respective quantities. The electrically insulating material according to the invention also has a good thermal conductivity. The electrical insulation material according to the invention can thus be used in high voltage and direct current, and advantageously without requiring an overdimensioning. The high voltage is defined by a voltage value greater than 50,000 volts in alternating current, and by a voltage value greater than 75,000 volts in direct current.

The electrically insulating composite material according to the invention may also have one or several of the following additional characteristic(s):
  the ionic liquid(s) is/are of ammonium, imidazolium, pyridinium or phosphonium type;
  the content of ionic liquid(s) ranges from 0.1 to 5% by mass, relative to the total mass of the electrically insulating composite material;
  the micrometric and/or mesometric filler(s) is/are selected from BN, a polyimide, $SiO_2$, $Al_2O_3$, $Al(OH)_3$, CaO, MgO, $CaCO_3$, and $TiO_2$;
  the content of micrometric and/or mesometric filler(s) ranges from 40 to 70% by mass, relative to the total mass of the electrically insulating composite material;
  the matrix is a polyepoxide matrix of diglycidyl ether type, and preferably a polyepoxide matrix of diglycidyl ether type of bisphenol A;
  the electrically insulating composite material has a volume electrical conductivity ranging from $10^{-18}$ to $10^{-12}$ S/m, preferably of about $10^{-15}$ S/m, preferably measured according to the standard ISO 62631-3;
  the electrically insulating composite material has a glass transition temperature Tg comprised between 70° C. and 160° C., preferably between 100° C. and 130° C.;
  the electrically insulating composite material has an elastic modulus greater than 5,000 MPa, preferably greater than 10,000 MPa, preferably measured according to the standard ISO 527.
  the polyepoxide matrix/ionic liquid(s) mass ratio ranges from 2 to 20%, and preferably from 4 to 10%;
  the electrically insulating composite material is in the form of an electrically insulating support able to maintain an electrical conductor in a metal-enclosed substation.

Within the framework of the invention, the measurement of the glass transition temperature is made using a differential scanning calorimeter (DSC) Q10 from TA instrument. The measurement is made using a ramp ranging from 25° C. to 175° C. for a Tg<150° C. or from 25° C. to 250° C. if the Tg is greater than 150° C. with a 20° C./min rise. Two thermal ramps are performed successively in order to monitor the value of the Tg. The Tg value corresponds to the transition start point (onset).

Another object of the invention relates to a method for manufacturing an electrically insulating composite material according to the invention, which comprises the following steps:
a) preparation of a crosslinkable mixture comprising an epoxy prepolymer of cycloaliphatic type or of diglycidyl ether type, one or several micrometric and/or mesometric filler(s), at least one ionic liquid, and optionally a crosslinking agent distinct from the ionic liquid(s),
b) introduction of said crosslinkable mixture into a mold, and
c) crosslinking of the crosslinkable mixture located in the mold.

Within the framework of the invention, it is meant by "crosslinkable mixture" the mixture of an epoxy prepolymer of cycloaliphatic type or of diglycicyl ether type, of one or several micrometric and/or mesometric inorganic filler(s), of at least one ionic liquid, optionally of a crosslinking agent distinct from the ionic liquid(s), and optionally of any usual additive known in the state of the art. Such a mixture is advantageously crosslinked as explained below.

Within the framework of the invention, the "epoxy prepolymer" refers to a non-crosslinked epoxy monomer. The epoxy prepolymer is transformed into a polyepoxide matrix by crosslinking.

Within the framework of the invention, it is meant by "crosslinking agent" an agent (that is to say a chemical compound) capable of reacting chemically with a crosslinkable prepolymer, and more particularly the epoxy prepolymer used within framework of the invention. For example, the crosslinking agent can be an activated hardener, a mixture containing a hardener and an initiator, or a combination of an initiator and a hardener.

The method according to the invention is easy to implement, and leads to an electrically insulating composite material having a good electrical resistance, a good mechanical resistance, a good resistance to electrical erosion and to propagation of electric arcs, a good thermal conductivity and having an electrical conductivity higher than that of the insulators commonly used for high voltage.

The method according to the invention may also have one or several of the following additional characteristic(s):
the crosslinkable mixture has a viscosity ranging from 6,000 mPa·s to 15,000 mPa·s, preferably from 10,000 mPa·s to 12,000 mPas, preferably measured at 80° C. according to the standard ISO 12058;
the crosslinkable mixture comprises a crosslinking agent distinct from the ionic liquid(s) selected from an activated hardener, a mixture containing an initiator and a hardener, or a combination of a hardener and an initiator, the hardener preferably being selected from the hardeners of amine or anhydride type;
the crosslinkable mixture does not comprise a crosslinking agent distinct from the ionic liquid(s);
the crosslinking is achieved by application of a crosslinking means, such as heating or UV.

Within the framework of the invention, a "crosslinking means" is a physical means allowing the crosslinking of the crosslinkable mixture, such as heating or UV.

The invention also relates to an electrically insulating support made of a material in accordance with the invention, as well as its manufacturing method.

Finally, another object of the invention relates to a metal-enclosed substation (GIS for Gas Insulated Switchgear) including an outer shell internally delimiting an enclosure in which a high voltage electrical conductor is mounted using electrically insulating supports according to the invention, made of an electrically insulating composite material according to the invention, or made of an electrically insulating composite material obtained by the method according to the invention. The gas insulated switchgear according to the invention can advantageously be used in direct current and high voltage.

Various other characteristics emerge from the description given below with reference to the appended drawings which show, by way of non-limiting examples, embodiments of the object of the invention.

FIG. 1 is a schematic view of an electrically insulating composite material according to the invention.

FIG. 2 is a sectional view of a metal-enclosed substation comprising an electrically insulating support in the form of a cone.

FIG. 3 is a sectional view of a metal-enclosed substation comprising an electrically insulating support in the form of a "post-type".

FIG. 4 is a graph representing the current density (A/m$^2$) as a function of the electric field for a formulation A according to the invention and for a formulation B apart from the invention.

The invention relates to an electrically insulating composite material 1 suitable for use in forming electrically insulating supports to hold in position the conductors present in the GIS. The electrically insulating composite material 1 is composed of a matrix 2 in which at least one micrometric and/or mesometric filler 3, as well as at least one ionic liquid 4 are dispersed.

The matrix 2 is a polyepoxide matrix of cycloaliphatic type or of diglycidyl ether type, formed respectively by the crosslinking of an epoxy prepolymer of cycloaliphatic type or of an epoxy prepolymer of diglycidyl ether type. Preferably, the matrix 2 is a matrix of diglycidyl ether type, and particularly diglycidyl ether of bisphenol A.

The polyepoxide matrix 2 is present in the electrically insulating composite material 1 in a content of less than 40% by mass relative to the total mass of the electrically insulating composite material. Preferably, the electrically insulating composite material 1 comprises the matrix 2 in a content greater than or equal to 20% by mass relative to the total mass of the electrically insulating composite material 1.

The electrically insulating composite material 1 also includes at least one filler 3. More specifically, the electrically insulating composite material 1 includes at least one micrometric filler 3, or at least one mesometric filler 3, or a combination of at least one micrometric filler 3 and at least one mesometric filler 3.

The filler(s) 3 used within the framework of the invention can be inert with respect to the matrix, that is to say they do not react therewith, or can be functionalized to allow an interaction with the matrix. Any micrometric and/or mesometric filler having electrical insulation properties may be suitable within the framework of the invention. Particularly, the micrometric and mesometric fillers 3 which can be used within the framework of the invention can be of any shape, and for example of spherical, quasi-spherical, tubular or lamellar shape.

The fillers 3 can be of inorganic or organic nature. Advantageously, the fillers 3 used within the framework of the invention are of inorganic nature, such as metal oxides.

Examples of micrometric fillers 3 include BN, polyimides, $SiO_2$, $Al_2O_3$, $Al(OH)_3$, CaO, MgO, $CaCO_3$, and $TiO_2$. Preferably, the micrometric fillers 3 are selected from $SiO_2$, $Al_2O_3$, $Al(OH)_3$ and $TiO_2$.

Examples of mesometric fillers 3 include BN, polyimides, $SiO_2$, $Al_2O_3$, $Al(OH)_3$, CaO, MgO, $CaCO_3$, and $TiO_2$. Preferably, the mesometric fillers 3 are selected from $SiO_2$, $Al_2O_3$, $Al(OH)_3$ and $TiO_2$.

According to one preferred embodiment of the invention, the electrically insulating composite material comprises, as a micrometric and/or mesometric filler 3, $Al_2O_3$.

According to one preferred embodiment of the invention, the electrically insulating composite material comprises a matrix 2 of the diglycidyl ether type, and particularly diglycidyl ether of bisphenol A, and $Al_2O_3$ as a micrometric and/or mesometric filler 3.

Within the framework of the invention, one or several filler(s) 3 can be surface-functionalized. Such functionalization allows particularly improving the compatibility of the fillers with the matrix, and thus improving the thermal conductivity of the material and the thermal expansion coefficient. The surface functionalizations of the fillers are usual in the state of the art and will not be detailed here.

The electrically insulating composite material 1 according to the invention comprises from 20% to 75% by mass of micrometric and/or mesometric fillers 3, preferably from 40 to 70% by mass, relative to the total mass of the electrically insulating composite material 1. The electrically insulating composite material 1 according to the invention advantageously comprises from 15 to 45% by volume of micrometric and/or mesometric fillers 3 relative to the total volume of the electrically insulating composite material 1.

The electrically insulating composite material 1 according to the invention also comprises at least one ionic liquid 4, in a content ranging from 0.1% to 20% by mass, preferably from 0.1% to 5% by mass, relative to the total mass of the electrically insulating composite material 1.

Any type of ionic liquid is suitable within the framework of the invention. Particularly, the ionic liquid(s) 4 can be selected from the salts formed by any combination of the cations and of the anions described below.

The ionic liquids 4 can comprise an ammonium, imidazolium, pyrrolidinium, pyridinium, piperidinium, triazolium, or phosphonium cation. Preferably, the cation of the ionic liquid 4 is selected from the ammonium, imidazolium, pyridinium and phosphonium cations.

Preferably, the ammonium cations used within the framework of the invention are of the following formula I:

[Chem. 1]

$$N^+(R1)(R2)(R3)(R4) \quad (I),$$

with R1, R2, R3 and R4 identical or different and selected from the $C_1$-$C_{20}$ alkyl groups, preferably $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl), —OH, —$NH_2$, —$SO_3H$, preferably one or several substituent(s) —$C_1$-$C_{10}$ alkyl, —CN or —O($C_1$-$C_6$ alkyl).

Preferably, the ammonium cations can be selected from those of formula I such that R1, R2, R3 and R4 are identical or different and selected from the $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl).

Examples of ammonium cations that can be used within the framework of the invention may include those of formula I such that R1, R2, R3 and R4 are identical or different and selected from methyl, ethyl, propyl, butyl, pentyl, hexyl groups, optionally substituted by one or several substituent(s) —CN, -OMe, -OEt, -Me.

Preferably, the imidazolium cations used within the framework of the invention are of the following formula II:

[Chem. 2]

(II)

with R5 and R6 identical or different and selected from the $C_1$-$C_{20}$ alkyl groups, preferably $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl), —OH, —$NH_2$, —$SO_3H$, preferably one or several substituent(s) —$C_1$-$C_{10}$ alkyl, —CN or —O($C_1$-$C_6$ alkyl).

Preferably, the imidazolium cations can be selected from those of formula II such that R5 and R6 are identical or different and selected from the $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl).

Examples of an imidazolium cation that can be used within the framework of the invention, may include those of formula II such that R5 and R6 are identical or different and are selected from methyl, ethyl, propyl, butyl, pentyl and hexyl groups, optionally substituted by one or several substituent(s) —$C_1$-$C_{10}$ alkyl, —CN, -OMe, -OEt.

Preferably, the pyridinium cations used within the framework of the invention are of the following formula III:

[Chem. 3]

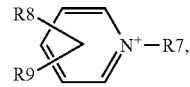

(III)

with:

R7, R8 and R9 identical or different,

R7 selected from the $C_1$-$C_{20}$ alkyl groups, preferably $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl), —OH, —$NH_2$, —$SO_3H$, preferably one or several substituent(s) —$C_1$-$C_{10}$ alkyl, —CN or —O($C_1$-$C_6$ alkyl), R8 and R9, identical or different, selected from a hydrogen atom, $C_1$-$C_{20}$ alkyl groups, preferably $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl), —OH, —$NH_2$, —$SO_3H$, preferably one or several substituent(s) —$C_1$-$C_{10}$ alkyl, —CN or —O($C_1$-$C_6$ alkyl).

According to one embodiment, R8 and R9 are in the meta position and do not represent a hydrogen atom.

According to one embodiment, R8 and R9 are in the ortho position and do not represent a hydrogen atom.

According to one embodiment, R9 represents a hydrogen atom, and R8 is in the para position and does not represent a hydrogen atom.

According to one embodiment, R8 and R9 each represent a hydrogen atom.

According to a first preferred embodiment, the pyridinium cation is selected from those of formula III with:
- R7 and R8, identical or different, and selected from the $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl),
- R9 representing a hydrogen atom, and
- R9 being located in the para position relative to the nitrogen atom of pyridinium.

According to a second preferred embodiment, the pyridinium cation is selected from those of formula III with:
- R7, R9 and R8, identical or different, selected from the $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl), and
- R8 and R9 being located in ortho position relative to the nitrogen atom of pyridinium.

According to a third preferred embodiment, the pyridinium cation is selected from those of formula III with:
- R7 is selected from the $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl), and
- R8 and R9 each representing a hydrogen.

Examples of a pyridinium cation that can be used within the framework of the invention, may include 1-(3-cyanopropyl)pyridinium and 1-butyl-4-methylpyridinium.

Preferably, the phosphonium cations used within the framework of the invention are of the following formula IV:

[Chem. 4]

$$P^+(R10)(R11)(R12)(R13) \qquad (IV),$$

with R10, R11, R12, and R13 identical or different, and selected from the $C_1$-$C_{20}$ alkyl groups, preferably $C_1$-$C_{10}$ alky groups, whether cyclic or preferably acyclic, linear or branched, substituted or unsubstituted by one or several substituent(s) selected from —$C_1$-$C_{10}$ alkyl, —CN, —O($C_1$-$C_6$ alkyl), —OH, —$NH_2$, —$SO_3H$, preferably one or several substituent(s) —$C_1$-$C_{10}$ alkyl, —CN or —O($C_1$-$C_6$ alkyl).

Preferably, the phosphonium cations can be selected from those of formula IV such that R10, R11, R12 and R13 are identical or different and selected from the $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl).

Examples of a phosphonium cation that can be used within the framework of the invention, may include the phosphonium cations of formula IV such that R10=R11=R12 and represent an unsubstituted linear or branched alkyl group, preferably a $C_1$-$C_{10}$ alkyl group, and for example an n-hexyl group, and R13 represents an unsubstituted linear or branched alkyl group, preferably a $C_1$-$C_{10}$ alkyl group, and for example an n-tetradecyl group.

The ionic liquids 4 can comprise an organic or inorganic anion.

Examples of inorganic anion that can be used, may include:
- halides such as $Cl^-$, $Br^-$, $I^-$, $F^-$,
- hexafluorophosphate ($PF_6^-$),
- boron tetrafluoride ($BF_4^-$).

Examples of organic anion that can be used within the framework of the invention, may include carbonates, tosylates, or phosphinates.

The phosphinates that can be used within the framework of the invention can be of the following formula V:

[Chem. 5]

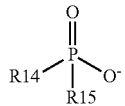

(V)

with R14 and R15 identical or different and selected from the $C_1$-$C_{20}$ alkyl groups, preferably $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl), —OH, —$NH_2$, —$SO_3H$, preferably one or several substituent(s) —$C_1$-$C_{10}$ alkyl, —CN or —O($C_1$-$C_6$ alkyl).

Preferably, the phosphinates can be selected from those of formula V such that R14 and R15 are identical or different and selected from the $C_1$-$C_{10}$ alkyl groups, whether cyclic or preferably acyclic, linear or branched, substituted or unsubstituted by one or several substituent(s) selected from —$C_1$-$C_{10}$ alkyl, —CN, —O($C_1$-$C_6$ alkyl).

Examples of phosphinate anion that can be used within the framework of the invention, may include the phosphinate anions of formula V such that R14=R15 and represent a 2,4,4-trimethylpentyl group.

According to one particular embodiment of the invention, the ionic liquid 4 used within the framework of the invention is formed of a phosphonium cation of formula IV as defined above and of a phosphinate anion of formula V as defined above. According to this embodiment, the ionic liquid may for example be of the following formula VI:

[Chem. 6]

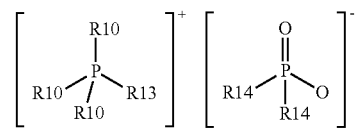

(VI)

with R10, R13 and R14 as defined above.

According to a particular embodiment of the invention, the ionic liquid 4 used within the framework of the invention is formed of a phosphonium cation of formula IV as defined above and of an inorganic anion, preferably a halide as defined above. According to this embodiment, the ionic liquid may for example be of the following formula VII:

[Chem. 7]

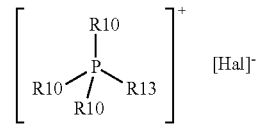

(VII)

with R10 and R13 as defined above, and Hal representing a halogen, and preferably Cl.

The electrically insulating composite material 1 can also include additives, such as diluents, or plasticizers.

The presence of an ionic liquid in small quantity allows slightly increasing the electrical conductivity of the electrically insulating composite material 1, and typically up to two orders of magnitude ($10^2$) compared to the same electrically insulating composite material without ionic liquid, without negatively impacting the other physico-chemical properties of the material. Thus, the electrically insulating composite material 1 according to the invention has an electrical conductivity ranging from $10^{-18}$ to $10^{-12}$ S/m, preferably about $10^{-15}$ S/m. Within the framework of the invention, the "electrical conductivity" refers to the volume electrical conductivity and/or to the surface electrical conductivity and can be measured according to standard ISO 62631-3.

Depending on the nature of the ionic liquid(s) 4 present, the electrical conductivity properties of the electrically insulating composite material 1 are modified in separate ways.

According to a first embodiment, the ionic liquid is dispersed in the polyepoxide matrix 2 without chemically modifying it. As represented in FIG. 1, the fillers of the ionic liquid are "free" within the matrix 2 and can induce an electric current.

According to a second embodiment, the polyepoxide matrix 2 is chemically and/or physically bonded to the ionic liquid. The electric current which can be induced is then modified by the presence of the ionic liquid.

According to a third embodiment, the polyepoxide matrix 2 is chemically and/or physically bonded to part of the ionic liquid, part of the ionic liquid then being dispersed in the matrix 2. The electric current that can be induced is then a combination of the presence of part of ionic liquid bonded to the matrix and part of "free" ionic liquid within the matrix.

The electrically insulating composite material 1 according to the invention is sufficiently hard to be able to form a support able to hold in position another part such as an electrical conductor. More specifically, the electrically insulating composite material 1 has an elastic modulus greater than 5,000 MPa, and preferably greater than 10,000 MPa. Within the framework of the invention, the elastic modulus is measured according to the standard ISO 527.

The electrically insulating composite material 1 according to the invention has characteristic carbon and phosphorus NMR spectra, allowing its identification by a comparison method.

The present invention also relates to a method for preparing an electrically insulating composite material 1 as defined within the framework of the invention. This method comprises the preparation of a crosslinkable mixture, its introduction into a mold, then the crosslinking of the crosslinkable mixture.

The first step of preparing a crosslinkable mixture is carried out by mixing, according to any technique known to those skilled in the art, an epoxy prepolymer, one or several micrometric and/or mesometric filler(s), and at least one ionic liquid.

The epoxy prepolymer may be an epoxy prepolymer of cycloaliphatic type or an epoxy prepolymer of diglycidyl ether type. According to a preferred embodiment of the invention, the epoxy prepolymer is an epoxy prepolymer of diglycidyl ether type, and particularly diglycidyl ether of bisphenol A.

The micrometric and mesometric fillers as well as the ionic liquids that can be used within the framework of the invention are as defined above for the electrically insulating composite material.

When the crosslinkable mixture comprises a crosslinking agent distinct from the ionic liquid(s) and/or an additive, these are incorporated into the crosslinkable mixture during this first step, or in a second step before finalizing the crosslinking.

According to one particular embodiment, the micrometric and/or mesometric fillers are mixed together firstly, then the ionic liquid is added to the mixture of fillers secondly, before the step of crosslinking the crosslinkable mixture.

Advantageously, the distribution of the fillers and of the ionic liquids in the crosslinkable mixture is homogeneous.

The second step of the method for manufacturing an electrically insulating composite material 1 according to the invention consists in introducing the crosslinkable mixture obtained in the first step into a mold having the desired shape. This introduction can be achieved using any technique known to those skilled in the art. Preferably, this introduction into the mold is achieved either by gravitational casting or by injection according to any technique known in the state of the art, such as gelation by automated pressure.

Within the framework of the invention, the crosslinkable mixture advantageously has a viscosity ranging from 6,000 mPa·s to 15,000 mPa·s, preferably from 10,000 mPa·s to 12,000 mPas, preferably measured at 80° C. according to the standard ISO 12058. Thus, the crosslinkable mixture has a viscosity allowing the manufacture by means of gravitational casting under vacuum or by automated pressure gelation, which facilitates the manufacture of the electrically insulating composite material according to the invention. In addition, a too high viscosity of the crosslinkable mixture would make it difficult to introduce into a mold and would cause the presence of bubbles in the crosslinkable mixture, and would therefore lead to a final material that is porous and/or that includes defects. In contrast, a too low viscosity would reduce the efficiency of the automated pressure gelation manufacturing method and would impact the dispersion of the fillers.

The third step of the method for manufacturing an electrically insulating composite material 1 according to the invention consists in crosslinking the crosslinkable mixture previously introduced into the mold. This crosslinking step can be carried out according to any technique known to those skilled in the art. Particularly, this step can take place in the presence of a crosslinking means, and optionally thanks to a separate crosslinking agent present in the crosslinkable mixture.

According to a first embodiment, part of the ionic liquid present in the crosslinkable mixture can initiate the crosslinking reaction of the epoxy prepolymer present in the crosslinkable mixture, and thus act as a crosslinking agent. In this case, the ionic liquid 4 chemically modifies the epoxy prepolymer, by bonding to it chemically or physically, then allowing a homopolymerization. This then leads to a polyepoxide matrix 2 chemically or physically bonded to part of the ionic liquid 4. According to this first embodiment, the crosslinkable mixture does not comprise a crosslinking agent distinct from the ionic liquid(s) present in the crosslinkable mixture. Alternatively according to this first embodiment, the crosslinkable mixture may contain a crosslinking agent, but in quantities less than what is necessary in the case where the crosslinkable mixture does not comprise ionic liquid able to initiate the crosslinking reaction of the epoxy prepolymer. This first embodiment advantageously allows simplifying the method and reducing the production costs.

According to a second embodiment, the ionic liquid(s) do/does not allow initiating the crosslinking reaction and a distinct crosslinking agent is required. According to this second embodiment, a crosslinking agent is therefore present in the crosslinkable mixture. The crosslinking agent can be a hardener possibly in combination with an initiator. More specifically, the crosslinking agent can be an activated hardener, a mixture containing a hardener and an initiator, or a combination of a hardener and an initiator. Within the framework of the invention, the hardeners and the initiators which can be used for the crosslinking from the epoxy prepolymer of cycloaliphatic type or of diglycicyl ether type are those commonly used in the state of the art. Examples of hardeners may include diamines and anhydrides.

According to one embodiment, the crosslinking step takes place without crosslinking means. According to another embodiment, the crosslinking step is carried out by a crosslinking means, such as heating or UV for example.

Finally, the method may comprise a last step consisting in demolding the structure obtained after the crosslinking step and made of an electrically insulating composite material 1, according to any technique known in the state of the art.

The thus obtained part made of electrically insulating composite material is easy to manufacture, and has the technical characteristics required to be used as an insulating support in high voltage and direct current (namely a good electrical resistance, a good mechanical resistance, a good resistance to electrical erosion and to internal propagation of electric arcs, a good thermal conductivity, a low porosity and an electrical conductivity higher than that of the high voltage alternating-current insulators).

As seen in FIGS. 2 and 3, the invention also relates to a metal-enclosed substation 5 including an outer shell 6 internally delimiting an enclosure 7 in which a high voltage electrical conductor 8 is mounted held in position by electrically insulating supports 9 made of an electrically insulating composite material 1 according to the invention. Thanks to the tightness of the metal outer shell 6, the internal volume of the enclosure 7 is filled with an insulating fluid, typically an insulating gas such as $SF_6$. Advantageously, the metal-enclosed substation 5 has direct current and high voltage.

According to a preferred exemplary embodiment represented in FIGS. 2 and 3, the metal outer casing 6 has a cylindrical shape. This example is not limiting.

A high voltage electrical conductor 8 of any type known per se is mounted inside the metal outer shell 6. The high voltage electrical conductor 8 has a tubular shape in the exemplary embodiment represented in FIGS. 2 and 3.

The high voltage electrical conductor 8 is held in the center of the metal outer casing 6 using electrically insulating supports 9, such as spacers made in the examples illustrated by cones (FIG. 2) or "post-types" (FIG. 3). Although not illustrated, other shapes could be envisaged. Whatever their shape, the electrically insulating supports 9 are made of an electrically insulating composite material 1 in accordance with the invention.

The invention also relates to an electrically insulating support made of an electrically insulating composite material according to the invention, or made of an electrically insulating composite material obtained by the method according to the invention. Such an electrically insulating support can be used in a metal-enclosed substation used in high voltage direct current.

The examples below allow illustrating the invention but are in no way limiting.

A formulation A according to the invention and a formulation B apart from the invention were prepared.

The formulation A according to the invention contains 18% by mass of epoxy prepolymer (marketed by Hunstman under the reference Araldite CY 5923), 14% by mass of an anhydride-type crosslinking agent (marketed by Huntsman under the name Aradur HY 5925), 66% by mass of $Al_2O_3$ filler (marketed by Imerys), and 2% by mass of a phosphonium-type ionic liquid (trihexyl (tetradecyl) phosphonium chloride, marketed by Cytec under the reference CYPHOS® IL101). The formulation A is prepared by mixing the epoxy prepolymer, the crosslinking agent and the filler, then by adding the ionic liquid to this mixture. The crosslinkable mixture is then crosslinked.

The formulation B apart from the invention comprises the same epoxy prepolymer, the same crosslinking agent and the same filler as the formulation A, but does not contain ionic liquid. The formulation B therefore comprises 19% by mass of epoxy prepolymer (marketed by Hunstman under the reference Araldite CY 5923), 15% by mass of an anhydride-type crosslinking agent (marketed by Huntsman under the name Aradur HY 5925) and 66% by mass of $Al_2O_3$ filler (marketed by Imerys). The formulation B is prepared in the same manner as the formulation A, except for the addition of ionic liquid.

The volume electrical conductivity of the formulations A and B was measured according to the standard ISO 62631. The results are reported in Table 1 and in FIG. 4.

The formulation A has a volume electrical conductivity approximately one decade greater compared to that of the formulation B, regardless of the temperature or of the electric field applied. Thus, the addition of ionic liquid in an electrical insulation material, in contents as described within the framework of the invention, allows slightly increasing the volume electrical conductivity of the material: the material thus obtained preserves its electrical insulation properties, while allowing better evacuation of the electric fillers.

TABLE 1

| Volume electrical conductivity (S/m) | 60° C.; 8 kV/mm | 80° C.; 8 kV/mm |
| --- | --- | --- |
| Formulation A | 9.92 $10^{-15}$ | 1.01 $10^{-13}$ |
| Formulation B | 9.06 $10^{-16}$ | 1.43 $10^{-14}$ |

The invention is not limited to the examples described and represented because various modifications can be made without departing from its framework.

The invention claimed is:

1. An electrically insulating composite material formed from:
   i) a polyepoxide matrix, said polyepoxide matrix being a cycloaliphatic polyepoxide matrix or a diglycidyl ether polyepoxide matrix, in a content of less than 40% by mass,
   ii) from 20 to 75% by mass of one or several micrometric and/or mesometric filler,
   iii) from 0.1 to 20% by mass of at least one ionic liquid, the masses being expressed relative to the total mass of the electrically insulating composite material,
   wherein the electrically insulating composite material has a volume electrical conductivity ranging from $10^{-18}$ to $10^{-12}$ S/m.

2. The electrically insulating composite material according to claim 1, wherein the at least one ionic liquid is of a selecammonium, an imidazolium, a pyridinium, or a phosphonium-based ionic liquid.

3. The electrically insulating composite material according to claim 1, wherein an amount of the at least one ionic liquid ranges from 0.1 to 5% by mass, relative to the total mass of the electrically insulating composite material.

4. The electrically insulating composite material according to claim 1, comprising at least one micrometric and/or mesometric filler selected from BN, a polyimide, $SiO_2$, $Al_2O_3$, $Al(OH)_3$, Cao, MgO, $CaCO_3$, and $TiO_2$.

5. The electrically insulating composite material according to claim 1, wherein the content of micrometric and/or mesometric filler ranges from 40 to 70% by mass, relative to the total mass of the electrically insulating composite material.

6. The electrically insulating composite material according to claim 1, wherein the matrix is a diglycidyl ether polyepoxide matrix.

7. The electrically insulating composite material according to claim 1, having a volume electrical conductivity of about $10^{-15}$ S/m.

8. The electrically insulating composite material according to claim 1, having a glass transition temperature Tg comprised between 70° C. and 160° C.

9. An electrically insulating support made of the electrically insulating composite material of claim 1.

10. A metal-enclosed substation including an outer shell internally delimiting an enclosure in which a high voltage electrical conductor is mounted using the electrically insulating support of claim 9.

11. The metal-enclosed substation according to claim 10 being a high voltage and direct current substation.

12. A method for manufacturing the electrically insulating composite material of claim 1, comprising the following steps:
   a) preparation of a crosslinkable mixture comprising a cycloaliphatic epoxy prepolymer, or a diglycidyl ether epoxy prepolymer, one or several micrometric and/or mesometric filler, at least one ionic liquid,
   b) introduction of said crosslinkable mixture into a mold, and
   c) crosslinking of the crosslinkable mixture located in the mold.

13. The method according to claim 12, wherein the crosslinkable mixture has a viscosity ranging from 6,000 mPa·s to 15,000 mPa·s, measured at 80° C., according to the standard ISO 12058.

14. The method according to claim 12, wherein the crosslinkable mixture comprises a crosslinking agent, distinct from the at least one ionic liquid, selected from an activated hardener, or a mixture containing a hardener and an initiator, or a combination of a hardener and an initiator.

15. The method according to claim 12, wherein the crosslinkable mixture does not comprise a crosslinking agent distinct from the at least one ionic liquid.

16. The method according to claim 12, wherein the crosslinking is achieved by application of a crosslinking means.

17. The electrically insulating composite material according to claim 1, wherein the volume electrical conductivity is measured according to the standard ISO 62631-3.

18. The electrically insulating composite material according to claim 7, wherein the volume electrical conductivity is measured according to the standard ISO 62631-3.

19. The electrically insulating composite material according to claim 1, having a glass transition temperature Tg comprised between 100° C. and 130° C.

20. The method according to claim 12, wherein the crosslinkable mixture comprises a crosslinking agent distinct from the at least one ionic liquid.

21. The method according to claim 12, wherein the crosslinkable mixture has a viscosity ranging from 10,000 mPa·s to 12,000 mPa·s, measured at 80° C., according to the standard ISO 12058.

22. The method according to claim 14, wherein the hardener is an amine hardener or an anhydride hardener.

23. The method according to claim 16, wherein the crosslinking means is heating or ultraviolet light.

24. The method according to claim 6, wherein the matrix is a diglycidyl ether bisphenol A polyepoxide matrix.

* * * * *